W. W. HEROY.
METHOD AND MEANS FOR SILENCING FLUID IN CONDUITS.
APPLICATION FILED NOV. 19, 1920.
1,432,462.  Patented Oct. 17, 1922.
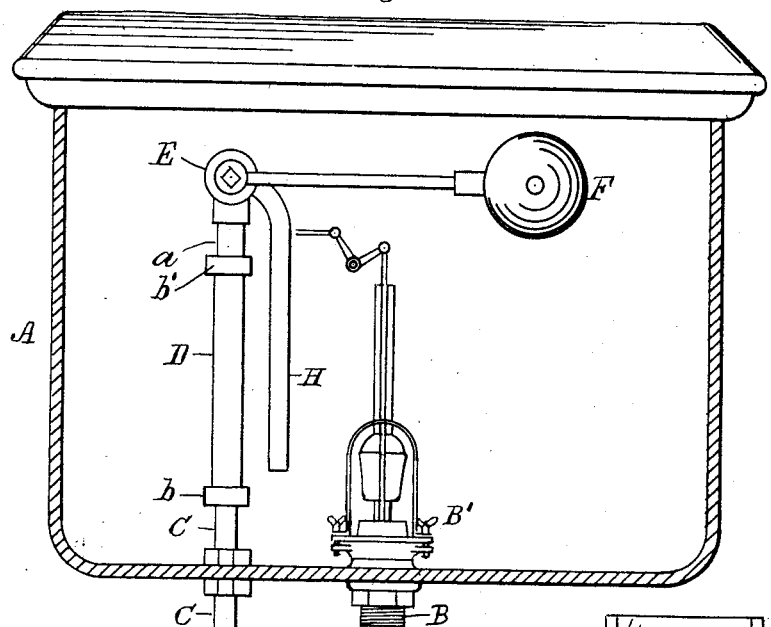
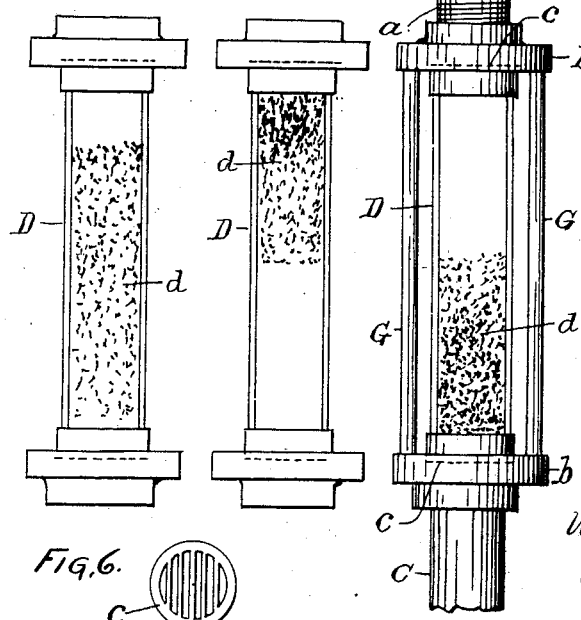
INVENTOR.
Walter W. Heroy, per
Thos. S. Crane,
ATTORNEYS.

Patented Oct. 17, 1922.

1,432,462

UNITED STATES PATENT OFFICE.

WALTER W. HEROY, OF BLOOMFIELD, NEW JERSEY.

METHOD AND MEANS FOR SILENCING FLUID IN CONDUITS.

Application filed November 19, 1920. Serial No. 425,065.

*To all whom it may concern:*

Be it known that I, WALTER W. HEROY, a citizen of the United States, residing at 28 Florence Avenue, Bloomfield, county of Essex and State of New Jersey, have invented certain new and useful Improvements in Methods and Means for Silencing Fluid in Conduits, fully described and represented in the following specification and the accompanying drawings forming a part of the same.

The object of this invention is to prevent the production of noise by the movement of fluid in the pipe by which it is carried.

Such movement of the fluid often causes noise which results from vibrations in the pipe and parts connected therewith, such noise giving great annoyance in the use of many kinds of apparatus in which intermittent movements of the water occur from the opening or closing of the pipe-outlet.

A flush-tank may be taken as an example of such apparatus, the noise resulting from the flow in the supply-pipe when the tank is flushed; and many means have been devised to obviate the noise which arises after each opening of the flush-valve.

It is known that the dynamic force contained in a pent-up fluid when under pressure and static will, when released, be diverted into several portions or component parts of the fluid, exerting separate distinct propelling forces, exhibiting the distribution of energy in direct relaton to the configuration or friction of the conduit; and causing a noise in proportion to the energy contained in the dynamics of the fluid, as disintegration takes place upon its release.

Such component parts of the fluid may be regarded as layers enveloping a central core of liquid which layers have a frictional contact with the bore of the pipe and generate the resulting noise.

In the present invention means, termed "noise arrester" herein, is provided to disintegrate the current of fluid moving in a pipe, so as to oppose and neutralize the vibrations conveyed to the pipe by the moving fluid.

This means consists of a mass of loose granular material confined between two grids in a given section of the pipe, but only partially filling the said section when at rest. The material is thus free to move or be lifted toward the outlet by the moving current of water, and the mass of such material is so proportioned to the capacity of the pipe-section that the degree of its movement or elevation in the section varies with the velocity of the escaping fluid, and adapts it to oppose the vibrations of the fluid with uniform effect when moving with different degrees of force. Such opposition disintegrates the outer layers of the water current and greatly reduces the skin friction and noise.

The operation of such a freely movable mass of granular material is found in practice to be essentially different from the operation of a filling of granular material which is not permitted free movement within the pipe-section.

When the fluid is in motion the movable material in the present invention intersects the flow of water at different points, and operates to disintegrate and break up the fluid parts whose dynamic force is convertible into noise if not otherwise diverted.

It will be observed that at each reversal of its movement the granular material is disposed in a different arrangement within the body of the arrester, which produces a very efficient action of the material.

The particles of material in their movements tend to abrade one another sufficiently to rub off any particles of foreign matter which have been deposited upon them.

If the section were entirely filled with granular material it would in the course of time be completely clogged by the deposit of foreign substance from the water flowing through it, and the provision of space for movement within the arrester thus produces a very useful result in such use of the granular material.

My improvement is shown in Fig. 1 of the drawing applied to a flush-tank; Fig. 2 shows the "noise-arrester" with the outlet-valve closed; Fig. 3 shows the same when the outlet-valve is open and the material raised by the moving current of fluid; Fig. 4 shows the settling of the material after the valve is closed; and Fig. 5 is a diagram illustrating the action of the water in passing through the "noise-arrester." Figs. 2 to 5 are upon a larger scale than Fig. 1. Fig. 6 is a plan of the grid.

A designates the flush-tank in Fig. 1, B the outlet to the closet-bowl which would be controlled by a flush-valve B' as is usual. C is the supply-pipe extended into the body of the "noise-arrester" within the tank, which body is provided upon the top with a tank-valve E controlled by the float F. The body D is represented as of glass to exhibit the movements that occur within the ordinary pipe, which may be made of iron, brass or lead, as required, a section of the supply-pipe in Fig. 2 being clamped by rods G between heads $b, b'$ at its opposite ends, which heads contain grids between which the charge of granular material $d$ is retained.

The head $b$ is connected to the supply-pipe C, and when the tank-valve E is opened by the falling of the ball F the water flows upwardly through the pipe C and arrester-section D, and escapes freely within the tank through the nozzle H.

Fig. 5 represents the section of pipe clamped between the heads $b$ and $b'$, and the flow of fluid through such section is illustrated diagrammatically in this figure. The fluid enters at the bottom, as indicated at the arrow $e$ and flows upwardly through the section to the outlet $a$.

It is observed that when the fluid is in motion as shown in Fig. 5, its center $f$ advances first and penetrates the granular material, and pushes through it before the particles in contact with the side-walls of the section have materially moved, owing to the skin friction.

The material next the walls of the section is ultimately lifted more or less according to the velocity of the moving current, and when packed in the upper part of the body D as shown in Fig. 3, it forces the flowing water away from the wall of the pipe and breaks the vibrations which would otherwise produce agitations of the pipe D and a corresponding volume of noise.

It is known that the movement of perfectly smooth surfaces upon one another produces no friction and corresponding little noise, but as the water flowing to the tank-valve under high pressure produces normally a great deal of noise, it is obvious that the water surrounding the central core $f$ is operating like separate layers of component parts $f'$ in rubbing its way through the section D and its outlet, and that the noise is caused by such separate actions and can be arrested by disintegrating the component parts of the current.

The rearrangement of the granular material at each reversal of such material produces a complete disintegration of the water current; and makes the operation of the arrester most effective, while it secures the self-cleansing of the granular material and permits the free passage of any foreign substance through the disintegrated mass.

Fig. 4 shows the gradual settling of the granular material $d$ as the tank-valve is gradually closed, thus changing the disposition of all its particles.

This is found to be effected in practice by the operation of the "noise-arrester" described (as seen through the glass section), in which the passage of the fluid through the loose granular material absorbs its energy in sufficient degree to overcome the skin friction of the fluid.

The employment of the granular material in a loose condition effects a very different result from the same material packed closely in a receptacle, or restrained even by its own weight from rising in the section through which the water passes, as the shifting of the granular material brings its particles into new lines of the fluid's movement. This is not effected where the water merely flows through permanent apertures in grids, or permanent apertures between particles of granular material.

My invention is thus a means of muffling the noise of a fluid moving within a pipe, and also affords a self-cleansing construction and arrangement of the granular material.

It is evident that the self-cleansing of the granular material will be effected in whatever position the arrester may be used, as for instance in a horizontal position, as the material being free to move within the body of the arrester would be agitated every time the liquid passed through it, and the particles cleanse one another in settling down upon the lower part of the body when the current ceased.

A "grid" or grating is referred to herein as less likely to be clogged than a finely perforated screen, but any form of screen may be used that is desired.

This "noise-arrester" may be used in connection with the flushometer or any apparatus which it may affect as described herein to restrain or prevent noise.

Having thus set forth the nature of the invention what is claimed herein is:

1. In the art of muffling the noise of an escaping fluid, the combination, with the pipe conveying such fluid, of a section having grids at both ends and the space between the grids partially filled with loose granular material free to be lifted by the current of fluid, such material being self-cleansing by the reversal of its movements.

2. In the art of muffling the noise of an escaping fluid, the combination, with the pipe conveying such fluid, of a section having grids at both ends, a valve controlling the escape of the fluid adjacent to one of the grids and the mass of such granular material being such as to be lifted until restrained by the upper grid, and to disintegrate the moving current of fluid and to check its vibrations and thus prevent the agitation of the fluid and the noise resulting therefrom.

3. The muffler constructed in accordance with claim 1, and having the pipe arranged in a vertical position to secure a prompt return of the granular material to its initial position after each agitation.

In testimony whereof I have hereunto set my hand.

WALTER W. HEROY.